United States Patent [19]

Old

[11] 4,377,300
[45] Mar. 22, 1983

[54] BALLAST WEIGHTS FOR TRACTORS
[75] Inventor: John L. Old, Kenilworth, England
[73] Assignee: Massey-Ferguson Services N.V., Curacao, Netherlands Antilles
[21] Appl. No.: 225,296
[22] Filed: Jan. 15, 1981
[30] Foreign Application Priority Data
Jan. 19, 1980 [GB] United Kingdom .................. 8001847
[51] Int. Cl.³ ............................................. B62D 49/00
[52] U.S. Cl. .................................................. 280/758
[58] Field of Search .................. 280/758, 759; 292/175
[56] References Cited
U.S. PATENT DOCUMENTS

| | | | |
|---|---|---|---|
| 1,554,541 | 9/1925 | Zeman .................................. | 292/175 |
| 1,678,982 | 7/1928 | Griffin .................................. | 292/175 |
| 2,315,455 | 3/1943 | Sale ..................................... | 292/175 |
| 4,094,534 | 6/1978 | Welke et al. ........................ | 280/759 |

FOREIGN PATENT DOCUMENTS

| | | | |
|---|---|---|---|
| 2429901 | 1/1976 | Fed. Rep. of Germany ...... | 280/759 |
| 1916996 | 11/1978 | Fed. Rep. of Germany ...... | 280/759 |
| 2000735 | 1/1979 | United Kingdom ................ | 280/759 |

*Primary Examiner*—Joseph F. Peters, Jr.
*Assistant Examiner*—Kenneth R. Rice
*Attorney, Agent, or Firm*—John C. Thompson

[57] ABSTRACT

A ballast weight for use on agricultural or industrial machines such as tractors, the weight being provided with a cut-out which opens through one edge and which receives part of a mounting frame attached to the machine. The weight is retained in position on the mounting frame by shaping the upper portion of the cut-out adjacent the opening to form a lip which can be hooked behind an upper part of the frame and by a linearly slidable latch member which is housed in a cavity provided in that portion of the weight which defines the lower portion of the cut-out. One end of the latch member projects from the upper end of the cavity into the cut-out and is arranged to automatically engage a locating formation on the lower part of the mounting frame under the action of a spring bias when the weight is brought into its operational position. The other end of the latch member is provided with an operating means, such as a finger hole or ring, which projects from the lower end of the cavity and enables the latch member to be linearly displaced within the cavity against the bias to disengage the frame thus enabling the weight to be removed from the frame.

7 Claims, 7 Drawing Figures

BALLAST WEIGHTS FOR TRACTORS

BACKGROUND OF THE INVENTION

This invention relates to an improvement, in the form of a ballast weight, for use on tractors or similar machines.

More specifically the invention is concerned with ballast weights, hereinafter referred to as being of the type specified, which are provided with a cut-out having an opening in one edge (normally the rear facing edge when the weight is fitted at the front of a machine such as a tractor) to receive at least part of a mounting frame which is attached to the machine, that portion of the weight defining the upper portion of the cut-out being shaped to provide a generally downwardly extending lip adjacent the opening which is arranged, when the weight is in its operational position, to extend behind an upper part of the frame whilst that portion of the weight defining the lower portion of the cut-out is arranged to extend beneath the lower part of the frame and to be secured thereto to complete the fastening of the weight to the frame. Ballast weights of the type specified have many uses. For example, they can be used on the front and rear of agricultural tractors, on industrial machines such as backhoes, on combine harvesters, and could also be used on agricultural implements such as disc ploughs and harrows.

Many different designs of weights of the type specified have been previously proposed but heretofore no simple, quick and long-term efficient manner of securing the weight to the lower part of the frame has been provided.

It is an object of the present invention to provide a ballast weight of the type specified with a simple, quick, and long-term efficient means of securing the weight in its operation position on its mounting.

SUMMARY OF THE INVENTION

Thus in accordance with the present invention there is provided a ballast weight of the type specified characterised in that the portion of the weight which defines the lower portion of the cut-out is provided with a cavity one end of which opens into the cut-out and the other end of which opens through a lower edge of the weight, a latch member being mounted for linear sliding movement within the cavity, the latch member being biassed so that one end thereof projects into the cut-out from said one end of the cavity to automatically engage a locating formation provided on the lower part of the mounting frame during installation of the weight thus securing the weight in its operational position, the other end of the latch being provided with an operating means which projects from said other end of the cavity and enables the latch to be linearly displaced within the cavity against the bias to disengage the mounting frame thus enabling removal of the weight.

Conveniently the operating means may take the form of an aperture in the latch member through which an operator's thumb or finger or some levering instrument can be inserted in order to linearly displace the latch member. Alternatively the operating means may comprise a ring through which an operator's thumb or finger or some levering instrument can be inserted in order to linearly displace the latch member, the ring passing as a loose fit through a hole in the latch member and hanging below the latch member.

Preferably the other end of the latch does not project below the lowermost part of the lower edge of the weight except when the latch member is undergoing linear displacement against the bias. The latch thus enjoys a high level of protection against damage. Such an arrangement can be achieved, for example, by providing a cut-away portion in the lower edge of the weight which allows access to the operating means when the other end of the latch member lies above the lowermost part of the lower edge of the weight. Also, by positioning the latch-containing cavity centrally of the weight in a transverse sense, the latch member is well protected and since the cavity is on the neutral axis of the weight that portion of the weight containing the latch member remains strong despite the fact that the weight may be formed from a somewhat brittle cast material.

It will be appreciated that the latch arrangement of the present invention can be easily released and in view of the simple linear sliding motion of the latch member within the cavity it is possible, by appropriate choice of dimensions, to minimise the ability of dirt and other extraneous matter to jam up the latch member by arranging that any such matter which does find its way between the latch member and the cavity walls is able to drop out through the other end of the cavity so that the latch arrangement is self-cleaning. This ensures that the linear sliding ability of the latch member is not impaired in the long term thus allowing the weight to continue to be easily removable from the mounting frame.

Preferably the bias comprises a spring housed in a spring-receiving aperture in the latch member and in co-operating recesses in the sides of the cavity, one end of the spring acting against abutment means on the latch member and the other end of the spring acting against abutment means on the weight.

Preferably said one end of the latch member is provided with a wedging surface which makes the contact with the locating formation when the weight is in its operational position, the bias being arranged to take up any clearances which may tend to occur between the wedging surface and the formation during use of the weight by further displacing the latch member into the cut-out thus maintaining the wedging action of the latching member against the formation.

Automatic latching of the weight can be conveniently achieved by providing a cam surface on said one end of the latch member, said cam surface being arranged to contact an abutment on said lower part of the mounting frame during mounting of the weight on the frame to automatically displace the latch member sufficiently far into the cavity to enable the latch member to pass under and then engage the locating formation. Thus, such a weight can be mounted on the frame by hooking the lip behind the upper part of the frame and then allowing the weight to swing downwardly so that said cam surface contacts the abutment thus displacing the latch member into the cavity and enabling the wedging surface to engage the locating formation.

In a preferred construction those portions of the weight designed to contact the mounting frame are provided with two raised formations which extend in planes spaced transversely of the weight so that the weight is only supported on these raised formations. This makes the weight less prone to swing sideways about a generally vertical axis.

The use of a linearly slidable latch member in the weight of the present invention makes it possible to limit the extent (in a longitudinal sense relative to the weight) of that portion of the weight which defines the lower portion of the cut-out and contains the latch member so that, after the necessary linear displacement of the latch member, the weight need only be rotated through a small angle before it can be lifted from the frame. Also preferably the wedging surface is located and oriented so that, following the necessary linear displacement of the latch member, only a small rotation of the weight is necessary to bring the latch member to a position in which it becomes ineffective to impede removal of the weight.

BRIEF DESCRIPTION OF THE DRAWINGS

Two embodiments of the present invention will now be described, by way of example only, by reference to the accompanying drawings in which.

Figure 1:
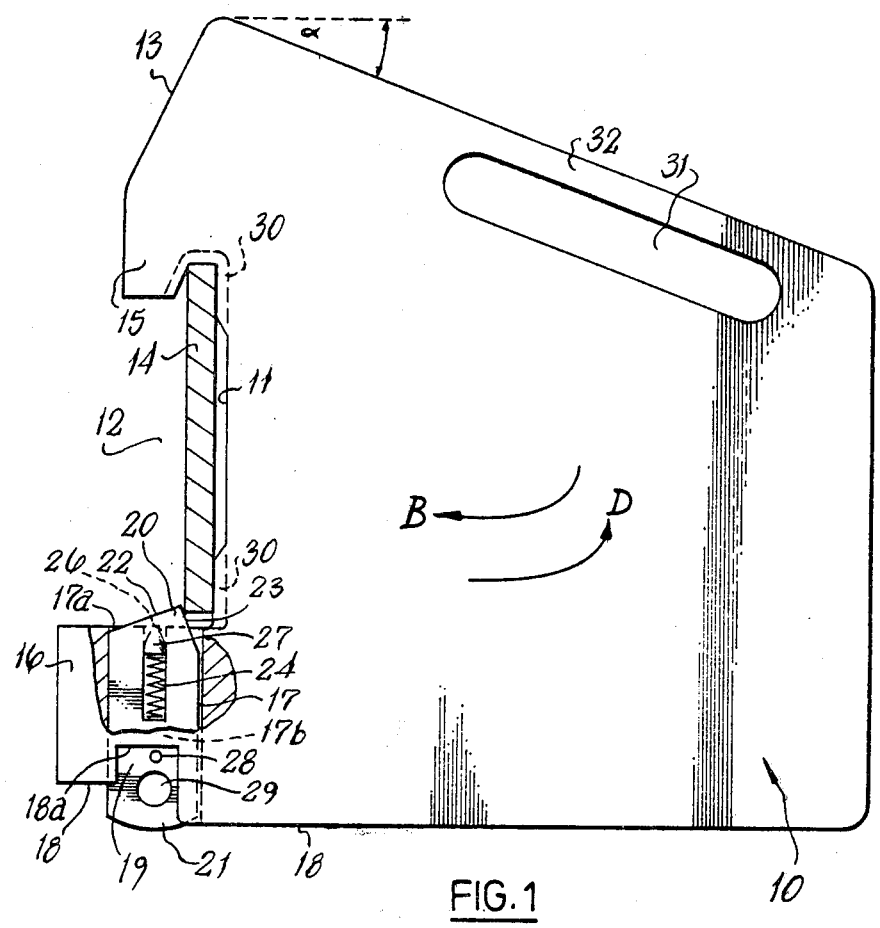
FIG. 1 is a diagrammatic side view of a ballast weight in accordance with the present invention.

The ballast weight 10 shown in FIG. 1 is provided with a cut-out 11 which opens at 12 through the rear edge of the weight. The cut-out 11 is shared shaped to receive a cross member 14 (shown sectioned in FIG. 1) which forms part of a mounting frame extending across the front of a tractor.

The upper portion of the cut-out 11 is shaped to provide a generally downwardly extending lip 15 which is arranged to hook behind the upper part of the cross member 14. The portion 16 of the weight which defines the lower portion of the cut-out is provided with a cavity 17 whose upper end 17a opens into the lower portion of the cut-out 11 and whose lower end 17b opens through a cut-away portion 18a of the lower edge 18 of the weight.

A latch member 19 is mounted for linear sliding movement within the cavity 17. One end 20 of the latch member projects from the upper end 17a of the cavity whilst the other end 21 of the latch member extends from the lower end 17b of the cavity at 18a.

Figure 3:
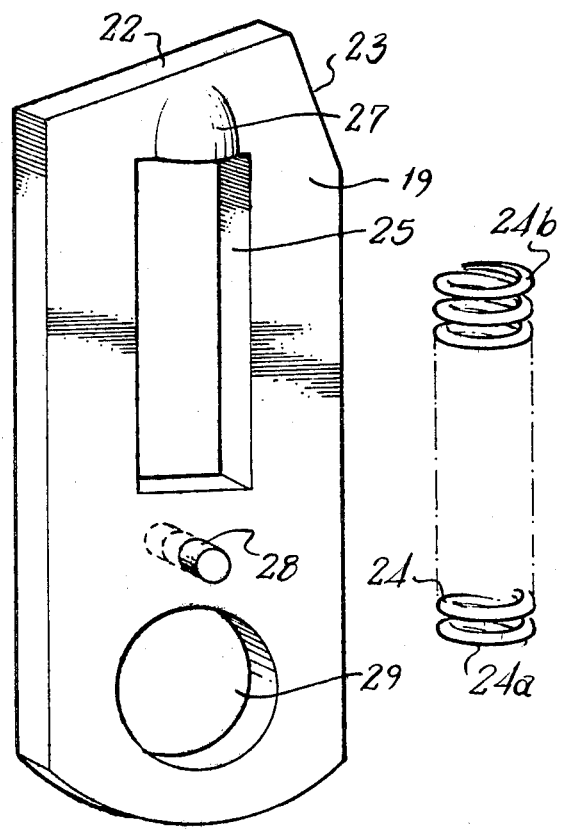
FIG. 3 is a perspective view of the latch member employed in FIG. 1 and the associated bias spring and retaining pin.

The upper end of the latch member is provided with a cam surface 22 and a wedging surface 23 whose purposes will be further discussed below. The latch member is biased into the cavity by a compression spring 24 which is housed in a rectangular spring-receiving aperture 25 (see FIG. 3) in the latch member 19 and also extends into two part-circular recesses 26 formed in the sides of cavity 17. The lower end 24a of the spring is arranged to react against the bases 26a of the recesses 26 whilst the upper end 24b of the spring acts against the upper end of the aperture 25 and also against circular projections 27 provided on the side faces of the latch member 19. Projections 27 also serve to close off the upper ends of the recesses 26 into which they project. The projections 27 could be replaced by, for example, simply placing a washer between the upper end 24b of the spring and the upper end of the aperture 25, this washer again projecting in recesses 26.

As an alternative (not shown) to the use of the spring locating recesses 26, the bottom end 24a of the spring 24 may be located on projections extending from the sides of the cavity which replace the function of the bases 26a of the recesses. These projections on the sides of the cavity may extend into grooves which extend longitudinally of the latch member. This type of construction is particularly appropriate when the thickness of the latch member 19 (i.e. its dimension transverse of the tractor) is larger relative to the thickness of the weight than shown in FIG. 2.

The maximum possible upward displacement of the latch member 19 is controlled by a pin 28 which extends through the latch member and contacts the cut away portion 18a of the lower edge of the ballast weight when the weight is removed from the mounting frame.

The provision of cut away portion 18a in the lower edge of the ballast weight greatly facilitates access to an operating means in the form of a circular aperture 29 which is formed adjacent the lower end of the latch member 19. Access can be further improved by chamfering off edge 18b if desired. As will be seen the latch member is well protected since it does not project below the lowermost part of the lower edge of the weight when the weight is in its operational position on the frame 14 as shown in FIG. 1.

Figure 2:
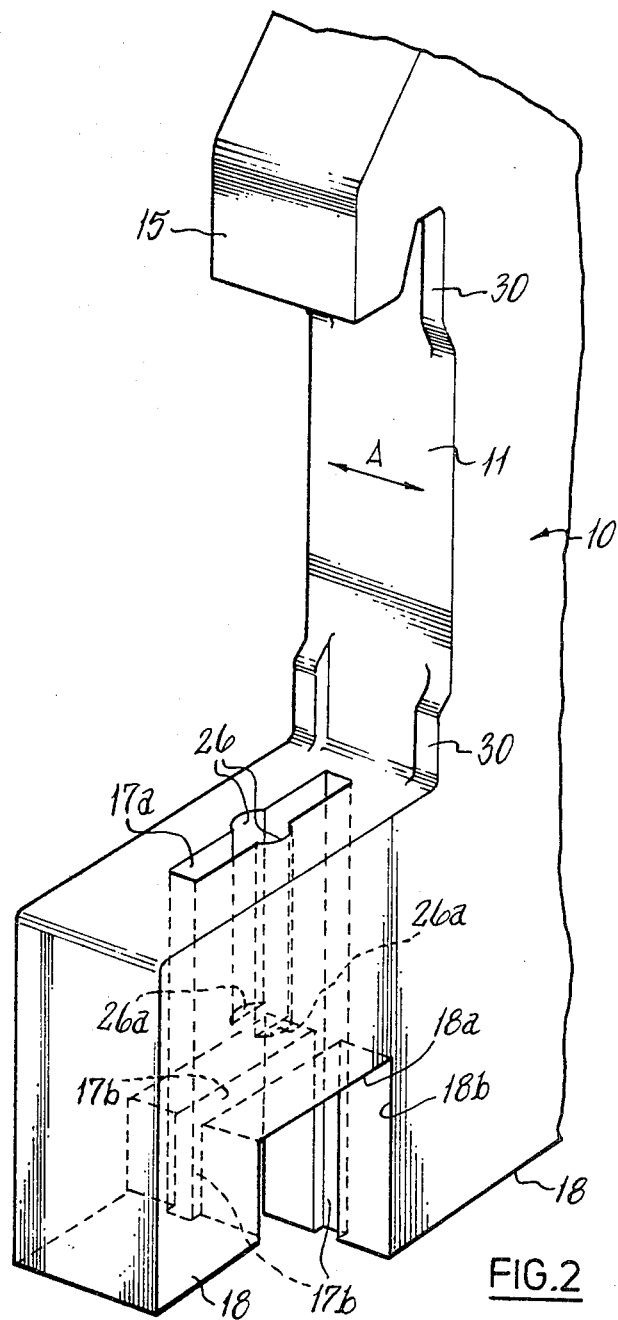
FIG. 2 is a perspective view of part of the ballast weight of FIG. 1 with the latch member removed.

Those portions of the main body of the ballast weight which are designed to contact the cross member 14 when the ballast weight is in operational position are provided with transversely spaced raised ribs or flanges 30 so that the weight is only supported on the cross member via these flanges thus assisting in stabilising the weight against swinging in a transverse sense as indicated by the arrow A in FIG. 2.

An elongated aperture 31 is provided adjacent the upper edge of the weight to form a handle 32 which can be used to mount and remove the ballast weight as described below. The inclination γ of the upper edge of the weight is arranged to be typically of the order of 15° to 20° so that when the weight is rotated during removal from the frame 14 the handle does not need to assume a marked rearward inclination. For ease of lifting the angle γ can be chosen so that the handle 32 is generally horizontal when the necessary rotating of the weight has been completed.

Figure 4:
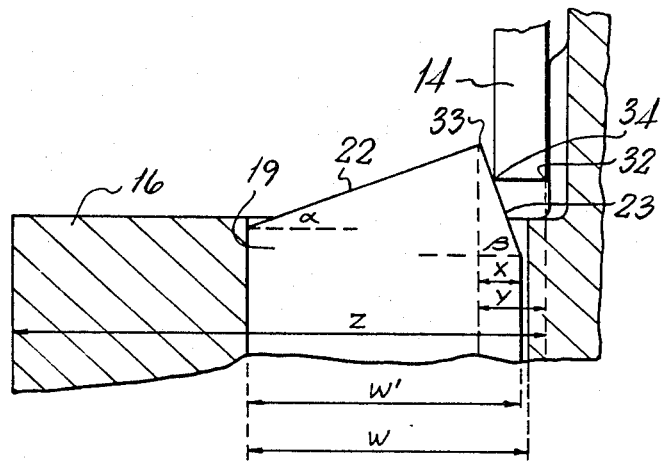
FIG. 4 diagrammatically shows the position occupied by the latching member when the ballast weight is in its operational position.
Figure 5:
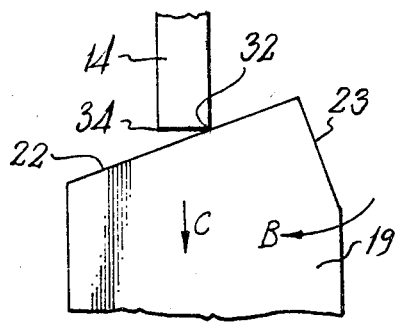
FIG. 5 diagrammatically shows a stage in the automatic latching process.

To mount the ballast weight 10 on the cross member 14 the weight is raised using handle 32 and the lip 15 is hooked over the upper part of the cross member. The weight is then allowed to swing downwardly in the direction of the arrow B in FIGS. 1 and 5 so that the cam surface 22 makes contact with an abutment in the form of the front lower corner 32 of the cross member thus downwardly displacing the latch member 19 as indicated by arrow C in FIG. 5. Prior to the ballast weight obtaining its operational position the outermost extremity 33 of the latch member snaps behind a locating formation in the form of the rear lower corner 34 of the cross member so that the wedging surface 23 on the latching member now contacts the lower corner 34. FIG. 4 shows the latching member in a typical position occupied when the weight has attained its correct operational position also shown in FIG. 1.

As will be appreciated during use of the weight there is a tendency for the weight to rock about the upper part of the mounting frame again in the direction of arrow B so that the frictional forces between the wedging surface 23 and the rear lower corner 34 of the mounting frame may periodically reduce allowing the spring 24 to displace the latching member 19 slightly further into the cut-out 11 thus restoring a good wedging action between the latching member and the mounting frame. Also since the corner 34 is designed to contact approximately the central region of the wedging surface 23 when in the FIG. 1 position, this automatically builds in a large level of manufacture tolerance in the positioning of the latch member 19 relative to those parts of the weight designed to contact the frame 14.

Figure 6:
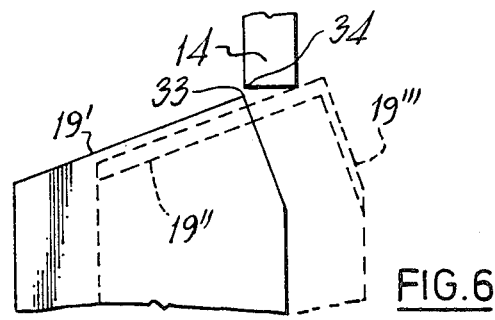
FIG. 6 diagrammatically shows the latching member in various positions during release of the ballast weight.

In order to release the weight from the cross member 14 the operator grips the handle 32 with one hand and either places a finger or thumb of the other hand, or some implement grasped in the other hand, through the circular aperture 29 in order to downwardly displace the latching member within the cavity 17 sufficiently to move the outermost extremity 33 of the latching member to a location below the lower edge of the cross member 14 as shown at position 19' in FIG. 6. The weight 10 can then be rotated in the direction of the arrow D in FIGS. 1 and 6 to a position, e.g. the position 19'' in FIG. 6, in which the extremity 33 of the latch member has rounded the corner 32 of the cross member to an unlatched position in which the latch is totally ineffective to impede the removal of the weight.

When the weight has been rotated sufficiently to bring the latch into position 19'' the operator can release the latch 19 so that the cam surface 22 contacts the corner 32 (see position 19''' in FIG. 6) thus enabling the operator to reposition the hand which has formerly been operating the latch to a better position in order to complete the removal of the weight from the cross member by further rotating the weight to ensure that the portion 16 of the weight which carries the latch has moved to a location in front of corner 32 and then raising the weight sufficiently to unhook the lip 15.

It is a particularly important feature of the present invention that the aperture 29 can be readily engaged by the operator's thumb since this allows the operator to easily exert the necessary force required to displace the latch member against spring 24. Portion 18b of the lower edge of the weight provides a surface against which any implement inserted through aperture 29 can be levered should the operator choose to release the latch member in this manner.

Typically the angle of inclination α of the cam surface 22 is of the order of 20 degrees and the angle of the inclination β of the wedging surface is of the order of 70 degrees. In selecting the inclination β for a particular installation a compromise must be reached between the requirement for smaller inclinations in order to provide a greater level of manufacturing tolerance and the requirement for larger inclinations in order to ensure that the latch member is not cammed downwardly during use of the weight over, for example, rough ground.

Dimension X, Y and Z of the latch arrangement shown in FIG. 4 are typically 0.375, 0.625 and 3.25 inches respectively. Using a weight employing the above dimensions it is possible to move the extremity 33 of the latch member to an unlatched position in front of corner 32 by rotating the weight through approximately 8 degrees in a direction D from its operational position and to move the weight to a position in which it can be lifted from the cross member 14 by a further 17 degree rotation in direction D. Clearly dimensions X and Y determine the unlatched position whilst the rearward projection Z determines the total amount of rotation necessary before the weight can be lifted off the cross member. By adjusting these and other dimensions it is possible to produce a weight construction which can be lifted from the frame after a total rotation of say 15 degrees from its operational position.

If it is desired to permanently hold the latch member 19 at a position below the bottom of cross member during removal of the weight this can easily be achieved by displacing the latch member 19 downwardly sufficiently to expose the bottom portion of aperture 25 below the top surface 18a (see FIG. 1) of the cut-out and inserting a pin through the exposed portion of aperture 25. This could be done before an attempt is made to rotate the weight thus enabling both hands to play their full part in rotating and lifting the weight. If desired so automatic means (not shown) could be provided for permanently holding the latch below the cross member 14 during release of the weight.

Also, in the unlikely event of the latch member 19 becoming lost from the weight, it would be possible, because of the provision of the through cavity 17, to insert a bolt upwardly through the cavity 17 so that the head of the bolt is seated against the cut away portion 18a while the upper end of the bolt projects behind cross member 14 to locate the weight in the same manner as the end 33 of the latch member. The bolt could easily be held in this position by threading a nut on the bolt to abut portion 16 of the weight at a location above the upper end 17a of the cavity 17.

As will be appreciated an important consideration in the long term efficiency of the latch member 19 is its previously referred to self-cleaning ability which ensures that whatever extraneous matter does enter the cavity, can drop out through the bottom end 17b thus preventing jamming of the latch member. The single most important factor in achieving a design which is resistant to jamming is the adoption of linearly slidable latching member disposed within a confining cavity with relatively large clearance. For example, in a weight having the dimensions referred to above, the width W of the cavity could be typically 2.125 inches while the corresponding dimension W' of the latch member would be 2 inches.

Figure 7:
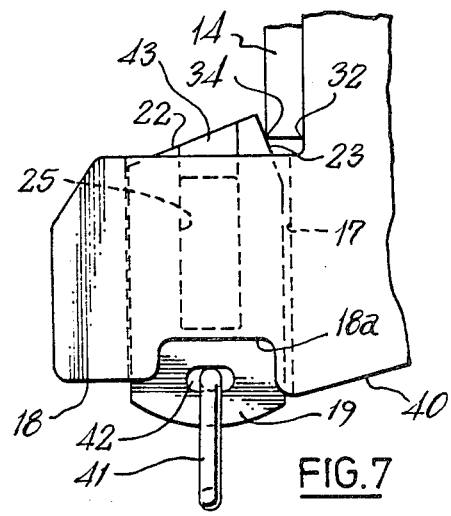
FIG. 7 shows a side view of part of a further form of weight in accordance with the present invention.

FIG. 7 shows part of a further form of weight in accordance with the present invention in which components with a similar function to components previously described with reference to FIGS. 1 to 6 have been similarly numbered. In the construction shown in FIG. 7 the length of the latch member 19 and the extent of the weight below the cutaway portion 18a have both been reduced in order to improve the ground clearance of the weight. To this end the aperture 29 and pin 28 have both been replaced by a ring 41 which extends as a loose fit through a hole 42 in the latch member. Thus the ring 41 serves as an operating means through which the operator's finger, thumb or some levering instrument can be inserted in order to pull down the latch member against the bias. The upward displacement of the latch member under the action of the bias is limited by contact of the ring 41 with the base 18a of the cut-out.

The ground clearance of the weight is further improved by arranging the lower edge of the weight to rise as indicated at 40.

In the embodiment shown in FIG. 7 the projections 27 are replaced by part-circular ribs 43 which extend from the upper end of the spring-receiving aperture 25 to the top of the latch member and slide up and down inside part-circular recesses 26 in the latch member cavity.

As will be appreciated, the ground clearance of the arrangement shown in FIG. 7 is in effect the clearance below the lowest part of the latch member 19 since the ring 41 is a loose fit in the hole 42 and will thus be deflected should it strike any object.

The operation of the alternative arrangement shown in FIG. 7 is identical to that previously described with reference to FIGS. 1 to 6 with the exception that the operator's finger, thumb or a levering instrument is inserted through the ring 41 rather than through the aperture 29.

The present invention thus provides a weight with a latch arrangement which is of a simple and easy to operate construction, which is self-cleaning and thus efficient in the long term, and which is well protected against damage and does not significantly weaken that part of the weight in which it is housed.

I claim:

1. A ballast weight having a cut out defined by upper, lower and forward portions, the cut out being capable of receiving at least part of a weight mounting frame having a locating formation on the lower parts thereof, the lower portion of the cut out being arranged to extend beneath the lower part of the weight mounting frame and being provided with a generally vertically extending through cavity, one end of the cavity opening into the cut out and the other end opening through a lower edge of the weight, a latch member mounted for linear sliding movement within the cavity, the latch member being biased so that one end thereof projects into the cut out from said one end of the cavity to automatically engage said locating formation during installation of ballast weight thus securing the ballast weight in its operational position on the frame, operating means on the other end of the latch member, said operating means projecting from said other end of the cavity to enable the latch member to be linearly displaced within the cavity against bias to disengage the mounting frame thus enabling removal of the ballast weight, the cross sectional shape of the cavity and the clearance between the latch member and the walls of the cavity ensuring that any extraneous material which enters the cavity is expelled by said linear displacement of the latch member within the cavity.

2. A ballast weight according to claim 1 in which the cavity is positioned centrally of the ballast weight in a transverse sense considering the ballast weight in its operational position.

3. A ballast weight according to claim 1 in which the bias comprises a spring housed in a spring-receiving aperture in the latch member and in co-operating recesses in the sides of the cavity, one end of the spring acting against abutment means on the latch member and the other end of the spring acting against abutment means on the ballast weight.

4. A ballast weight according to claim 1 in which said one end of the latch member is provided with a wedging surface which makes the contact with the locating formation when the ballast weight is in its operational position, the bias being arranged to take up any clearances which may tend to occur between the wedging surface and the locating formation during use of the ballast weight by further displacing the latch member into the cut-out thus maintaining the wedging action of the latch member against the locating formation.

5. A ballast weight according to claim 1 in which a cam surface is provided on said one end of the latch member, said cam surface being arranged to contact an abutment on said lower part of the mounting frame during mounting of the weight on the frame to automatically displace the latch member sufficiently far into the cavity to enable the latch member to pass under and then engage the locating formation.

6. A ballast weight according to claim 1 in which those portions of the weight designed to contact the mounting frame are provided adjacent the transversely spaced sides of the weight with pairs of transversely spaced raised formations which extend in planes spaced transversely of the weight so that the weight is only supported on these raised formations.

7. A ballast weight according to claim 1 in which a cut away portion is provided in the lower edge of the ballast weight, the operating means extending into the cut away portion when said one end of the latch member lies above the lowermost part of the lower edge of the weight, the lowermost portion of the operating means being disposed within the cut away portion when the latch member is biased to its normal operative position.

* * * * *